United States Patent
Leu et al.

(10) Patent No.: US 7,387,423 B2
(45) Date of Patent: Jun. 17, 2008

(54) LIGHT GUIDE PLATE WITH TRANSMITTANCE ENHANCEMENT LAYER AND BACKLIGHT SYSTEM USING SAME

(75) Inventors: Charles Leu, Fremont, CA (US);
Ching-Yen Lee, Tu-Cheng (TW);
Ga-Lane Chen, Fremont, CA (US);
Tai-Cherng Yu, Tu-Cheng (TW);
Jhy-Chain Lin, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 246 days.

(21) Appl. No.: 11/023,013

(22) Filed: Dec. 23, 2004

(65) Prior Publication Data
US 2005/0190576 A1 Sep. 1, 2005

(30) Foreign Application Priority Data
Feb. 27, 2004 (TW) .............................. 93105057 A

(51) Int. Cl.
*F21V 8/00* (2006.01)
*C09K 19/52* (2006.01)

(52) U.S. Cl. ...................... 362/627; 362/618; 362/622; 362/629

(58) Field of Classification Search ............... 362/618, 362/622, 627, 29; 428/1.6
See application file for complete search history.

(56) References Cited

U.S. PATENT DOCUMENTS

| | | | | |
|---|---|---|---|---|
| 5,422,756 | A | * | 6/1995 | Weber .......................... 359/487 |
| 5,518,783 | A | * | 5/1996 | Kawata et al. ................ 428/1.1 |
| 5,547,763 | A | * | 8/1996 | Scozzafava et al. ......... 385/130 |
| 6,443,583 | B1 | | 9/2002 | Ha ................................ 362/31 |
| 6,610,222 | B1 | * | 8/2003 | Edlinger et al. ............ 264/1.27 |

FOREIGN PATENT DOCUMENTS

| | | |
|---|---|---|
| CN | 2431617 | 5/2001 |
| CN | 1460198 A | 12/2003 |
| CN | 2590032 Y | 12/2003 |
| JP | H10-73816 | 3/1998 |
| JP | 200272183 A | 3/2002 |

* cited by examiner

*Primary Examiner*—Ismael Negron
(74) *Attorney, Agent, or Firm*—Jeffrey T. Knapp

(57) ABSTRACT

A backlight system has a light guide plate. The light guide plate includes a transparent plate having a light incidence surface and an opposite light emitting surface, and a light transmittance enhancement layer. The light transmittance enhancement layer is provided on either or both of the light emitting surface and the light incidence surface, and is made of silicon dioxide or magnesium fluoride. The thickness of the light transmittance enhancement layer is in the range from 58~69 nanometers.

17 Claims, 1 Drawing Sheet

LIGHT GUIDE PLATE WITH TRANSMITTANCE ENHANCEMENT LAYER AND BACKLIGHT SYSTEM USING SAME

BACKGROUND OF THE INVENTION

1. Field of the Invention

The present invention relates to light guide plates (LGPs) of liquid crystal displays (LCDs), and backlight systems using such LGPs.

2. Description of the Prior Art

A typical LCD device comprises an LCD panel, and a backlight system mounted under the LCD panel for supplying light beams thereto. The backlight system mainly comprises a light source and an LGP. The LGP is normally a transparent polymer plate, and is used for guiding light beams emitted by the light source to uniformly illuminate the LCD panel.

FIG. 3 represents a backlight system 1 as disclosed in U.S. Pat. No. 6,443,583. The backlight system 1 includes a light source 110, a light source cover 120, and an LGP 200. The LGP 200 comprises a light incident surface 201, a light emitting surface 203 adjoining the light incident surface 201, and a bottom surface 202 opposite to the light emitting surface 203. The backlight system 1 further comprises a reflective sheet 210 underlying the bottom surface 202, a diffusion sheet 220 adjacent the light emitting surface 203, a prism sheet 230 disposed on the diffusion sheet 220, and a protecting film 240 disposed on the prism sheet 230. The prism sheet 230 serves to redirect diffused light emitting from the diffusion sheet 220 so that it is more concentrated.

In operation, the light source 110 emits light beams and the light beams are transmitted into the LGP 200. The reflective sheet 210 reflects the light beams and directs the light beams to exit from the light emitting surface 203. The light beams then sequentially pass through the diffusion sheet 220, the prism sheet 230 and the protecting film 240 to illuminate a liquid crystal panel (not shown).

The LGP 200 is conventionally made of a polymethyl methacrylate (PMMA) resin. In general, the transmittance of light of PMMA is in the range from 91%~92%. This relatively low transmittance of light reduces the light utilization efficiency of the backlight system 1.

It is desired to provide a backlight system and an LGP used therein which overcome the above-mentioned problem.

SUMMARY OF THE INVENTION

Accordingly, an object of the present invention is to provide an LGP which enhances the efficiency of light utilization.

Another object of the present invention is to provide a backlight system which enhances the efficiency of light utilization.

In order to achieve the first object set out above, an LGP in accordance with one embodiment of the present invention includes a transparent plate and a light transmittance enhancement layer. The transparent plate includes a light emitting surface, and a light incidence surface opposite to the light emitting surface. The light transmittance enhancement layer is provided on the light emitting surface. The light transmittance enhancement layer is made of silicon dioxide or magnesium fluoride. A thickness of the light transmittance enhancement layer is in the range from 58~69 nanometers. Because of the light transmittance enhancement layer, the light guide plate has enhanced efficiency of utilization of visible light.

In order to achieve the second object set out above, a backlight system in accordance with the present invention includes the LGP described above, and a light source located under the LGP.

Other objects, advantages, and novel features of the present invention will become more apparent from the following detailed description when taken in conjunction with the accompanying drawings, wherein:

DETAILED DESCRIPTION OF THE PRESENT INVENTION

Reference now will be made to the drawings to describe the present invention in detail.

Figure 1:
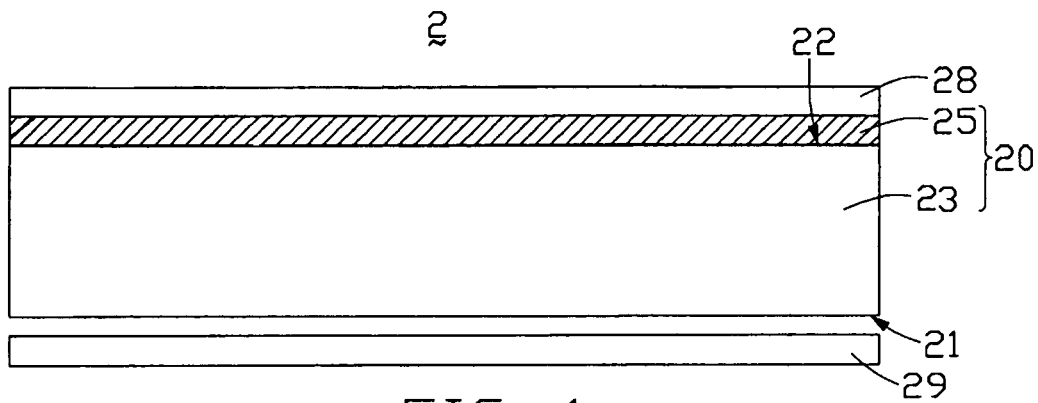
FIG. 1 is a schematic, side cross-sectional view of a backlight system in accordance with a first embodiment of the present invention.

Referring to FIG. 1, a backlight system 2 in accordance with the first embodiment of the present invention includes a plate-like light guide member 20, a light source 29, and a diffusion plate 28.

The light guide plate (LGP) 20 includes a transparent plate 23 as a base and a light transmittance enhancement layer 25. The transparent plate 23 is rectangular, and may have a uniform thickness or be wedge-shaped. In the illustrated embodiment, the transparent plate 23 has a uniform thickness of 0.85 millimeters. The transparent plate 23 includes a light emitting surface 22 on a top thereof, and a light incidence surface 21 opposite to the light emitting surface 22. The transparent plate 23 is made of a polyester, such as a polyacrylic resin, a polycarbonate resin, a polyvinyl resin or a PMMA resin. In the illustrated embodiment, the transparent plate 23 is made of a PMMA resin. The light transmittance enhancement layer 25 is made of silicon dioxide ($SiO_2$) or magnesium fluoride ($MgF_2$). The light transmittance enhancement layer 25 may be formed on the light emitting surface 22 or the light incidence surface 21. In the illustrated embodiment, the light transmittance enhancement layer 25 is formed on the light emitting surface 22. The light transmittance enhancement layer 25 is formed by way of electron beam evaporation. A thickness of the light transmittance enhancement layer 25 is in the range from 58~69 nanometers, and preferably 67.22, 59.44, or 62.67 nanometers.

The light source 29 is located under the light incidence surface 21 of the LGP 20. The diffusion plate 28 is disposed on the light transmittance enhancement layer 25.

Practical experiments have demonstrated that, because of the light transmittance enhancement layer 25, the light transmittance of the LGP 20 can respectively be improved to 92.14%, 93.18%, 93.08%, and 93.05% for light having wavelengths of 350, 550, 750, and 800 nanometers respectively. That is, the transmittances of visible light of the LGP 20 and the backlight system 2 are greatly improved. Accordingly, the light utilization efficiencies of the LGP 20 and the backlight system 2 are enhanced.

Figure 2:
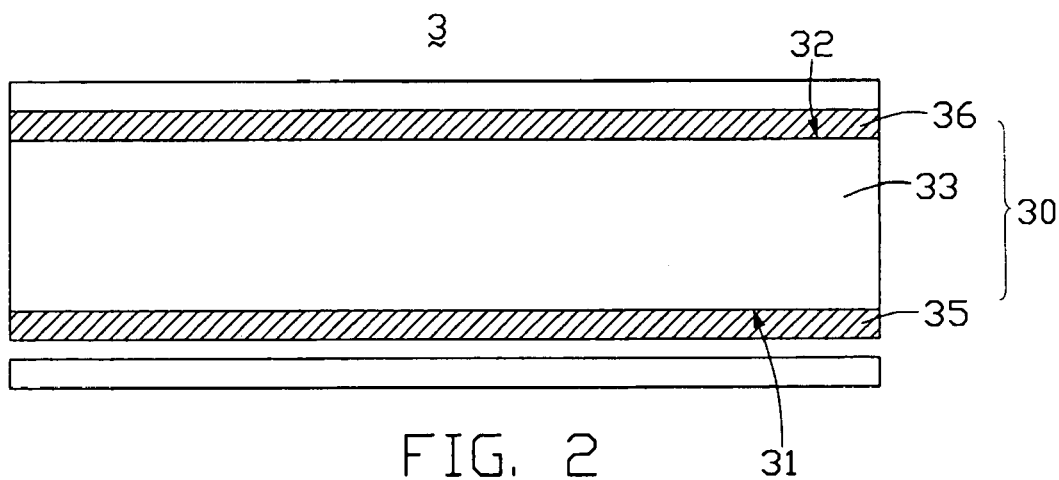
FIG. 2 is a schematic, side cross-sectional view of a backlight system in accordance with a second embodiment of the present invention.
Figure 3:
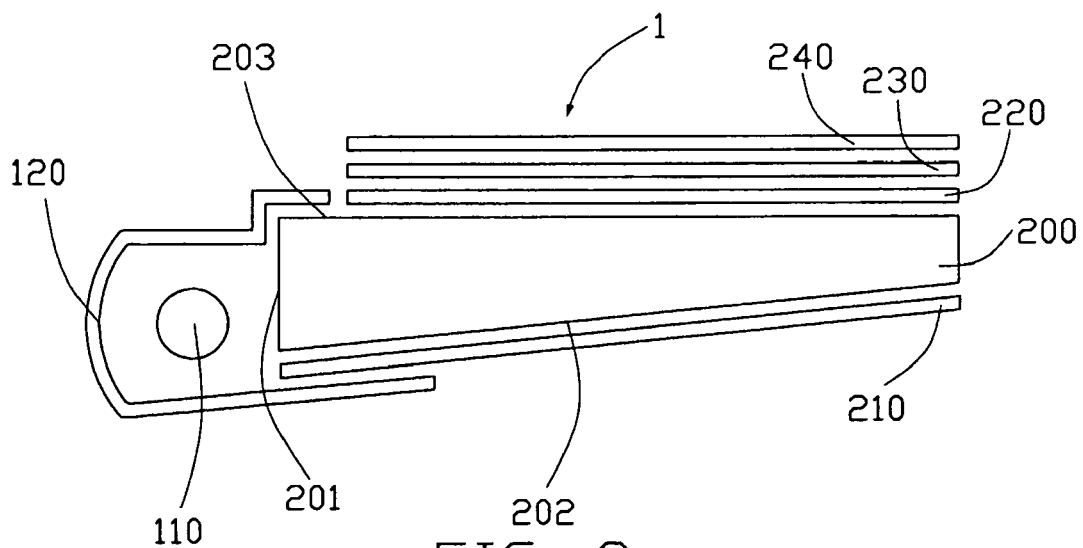
FIG. 3 is an exploded, side elevation of a conventional backlight system.

FIG. 2 is a schematic, side cross-sectional view of a backlight system 3 in accordance with the second embodiment of the present invention. Unlike in the backlight system 2 of the first embodiment, two light transmittance enhancement layers 35, 36 are respectively formed on a light emitting surface 32 and a light incidence surface 31 of a transparent plate 33 of an LGP 30. Each of the light transmittance enhancement layers 35, 36 is made of silicon dioxide or magnesium fluoride. A thickness of each of the light transmittance enhancement layers 35, 36 is in the range from 58~69 nanometers.

Practical experiments have demonstrated the following. If one of the light transmittance enhancement layers 35, 36 is made of silicon dioxide with a thickness of 63.65 nanometers, and the other light transmittance enhancement layer 35, 36 is made of magnesium fluoride with a thickness of 67.52 nanometers, then the light transmittance of the LGP 30 can be improved to 95.15%, 94.84%, 94.13%, and 93.99% for light having wavelengths of 350, 550, 750, and 800 nanometers respectively. Similarly, if one of the light transmittance enhancement layers 35, 36 is made of silicon dioxide with a thickness of 59.44 nanometers, and the other light transmittance enhancement layer 35, 36 is made of magnesium fluoride with a thickness of 67.52 nanometers, then the light transmittance of the LGP 30 can be improved to 93.94%, 94.08%, 94.79%, and 95.16% respectively. If both light transmittance enhancement layers 35, 36 are made of silicon dioxide with a thickness of 59.44 nanometers, then the light transmittance of the LGP 30 can be improved to 93.37%, 93.43%, 93.65%, and 93.38% respectively. If both light transmittance enhancement layers 35, 36 are made of magnesium fluoride with a thickness of 67.52 and 62.67 nanometers respectively, then the light transmittance of the LGP 30 can be improved to 94.39%, 94.60%, 95.80%, and 97.04% respectively. It is clear that the LGP 30 having two light transmittance enhancement layers 35, 36 outperforms the LGP 20 having one light transmittance enhancement layer 25 as regards light transmittance.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A light guide plate, comprising:
    a transparent plate having a light emitting surface and a light incidence surface opposite to the light emitting surface; and
    a light transmittance enhancement layer provided on either the light emitting surface or the light incidence surface;
    wherein the light transmittance enhancement layer is made of silicon dioxide or magnesium fluoride, and a thickness of the light transmittance enhancement layer is in the range from 58~69 nanometers.

2. The light guide plate as claimed in claim 1, wherein the thickness of the light transmittance enhancement layer is approximately 67.22 nanometers.

3. The light guide plate as claimed in claim 1, wherein the thickness of the light transmittance enhancement layer is approximately 59.44 nanometers.

4. The light guide plate as claimed in claim 1, wherein the thickness of the light transmittance enhancement layer is approximately 62.67 nanometers.

5. The light guide plate as claimed in claim 1, wherein the transparent plate is made of a polymethyl methacrylate resin, and a thickness of the transparent plate is approximately 0.85 millimeters.

6. The light guide plate as claimed in claim 1, wherein the light transmittance enhancement layer is formed on either the light emitting surface or the light incidence surface by electron beam evaporation.

7. The light guide plate as claimed in claim 1, further comprising another light transmittance enhancement layer provided on the other of the light emitting surface and the light incidence surface.

8. The light guide plate as claimed in claim 7, wherein a thickness of each of the light transmittance enhancement layers is approximately 59.44 nanometers.

9. The light guide plate as claimed in claim 7, wherein a thickness of one of the light transmittance enhancement layers is approximately 63.65 nanometers, and a thickness of the other light transmittance enhancement layer is approximately 67.52 nanometers.

10. The light guide plate as claimed in claim 7, wherein a thickness of one of the light transmittance enhancement layers is approximately 62.67 nanometers, and a thickness of the other light transmittance enhancement layer is approximately 67.52 nanometers.

11. The light guide plate as claimed in claim 7, wherein a thickness of one of the light transmittance enhancement layers is approximately 59.44 nanometers, and a thickness of the other light transmittance enhancement layer is approximately 67.52 nanometers.

12. A backlight system comprising:
    a light guide plate including:
    a transparent plate having a light emitting surface and a light incidence surface opposite to the light emitting surface; and
    at least one light transmittance enhancement layer provided on at least one of the light emitting surface and the light incidence surface;
    wherein said light transmittance enhancement layer is made of silicon dioxide or magnesium fluoride, and a thickness of said light transmittance enhancement layer is in the range from 58~69 nanometers; and
    a light source located adjacent the light incidence surface of the transparent plate.

13. A method for manufacturing a light guide member, comprising the steps of:
    providing a light-transmittable base to form a main body of said light guide member; and
    forming a layer made of material for enhancement to light transmittance of said base on at least one side of said base, wherein a thickness of said layer is in the range from 58~69 nanometers.

14. The method as claimed in claim 13, wherein said layer is formed on said at least one side of said base by means of electron beam evaporation during said forming step.

15. The method as claimed in claim 13, wherein said material of said layer is one of silicon dioxide and magnesium fluoride.

16. The method as claimed in claim 13, further comprising the step of forming another layer for enhancement to light transmittance of said base on another side of said base other than said at least one side of said base.

17. The method as claimed in claim 16, wherein a thickness of said another layer is different from said thickness of said layer.

* * * * *